United States Patent
Peltier et al.

(10) Patent No.: US 9,316,158 B2
(45) Date of Patent: Apr. 19, 2016

(54) POWER TAKE-OFF GEARBOX ON A TURBOMACHINE, CONSISTING OF AN ASSEMBLED HOUSING

(71) Applicant: Hispano Suiza, Colombes (FR)

(72) Inventors: Jordane Peltier, Paris (FR); Stéphane Prunera-Usach, Rueil Malmaison (FR)

(73) Assignee: HISPANO SUIZA, Colombes (FR)

( * ) Notice: Subject to any disclaimer, the term of this patent is extended or adjusted under 35 U.S.C. 154(b) by 0 days.

(21) Appl. No.: 14/437,030

(22) PCT Filed: Oct. 24, 2013

(86) PCT No.: PCT/FR2013/052545
§ 371 (c)(1),
(2) Date: Apr. 20, 2015

(87) PCT Pub. No.: WO2014/064390
PCT Pub. Date: May 1, 2014

(65) Prior Publication Data
US 2015/0285153 A1    Oct. 8, 2015

(30) Foreign Application Priority Data
Oct. 26, 2012   (FR) ..................... 12 60242

(51) Int. Cl.
| | |
|---|---|
| *F02C 7/32* | (2006.01) |
| *F16H 57/033* | (2012.01) |
| *B60K 25/00* | (2006.01) |
| *B64D 41/00* | (2006.01) |

(52) U.S. Cl.
CPC . *F02C 7/32* (2013.01); *B60K 25/00* (2013.01); *F16H 57/033* (2013.01); *B64D 41/007* (2013.01); *B64D 2041/002* (2013.01); *Y10S 74/05* (2013.01); *Y10T 74/2186* (2015.01)

(58) Field of Classification Search
CPC ............ F02C 7/32; F02C 7/36; F16H 57/033; B64D 41/00; B64D 41/007; B64D 2041/002; B60K 25/00; Y10T 74/2186; Y10S 74/05
USPC .................. 74/11, 15.8, 15.2, 606 R; 60/802; 244/58
See application file for complete search history.

(56) References Cited

U.S. PATENT DOCUMENTS

| | | |
|---|---|---|
| 6,142,418 A | 11/2000 | Weber |
| 6,840,479 B1 | 1/2005 | Przygoda |
| 8,973,465 B2 * | 3/2015 | Duong .................... F16H 1/222 60/802 |

(Continued)

OTHER PUBLICATIONS

Search Report issued in French Patent Application No. FR 12 60242 dated Apr. 13, 2013.
International Search Report issued in Application No. PCT/FR2013/052545 dated Feb. 5, 2014.
Written Opinion issued in Application No. PCT/FR2013/052545 dated Feb. 5, 2014.

(Continued)

*Primary Examiner* — Keith Frisby
(74) *Attorney, Agent, or Firm* — Pearne & Gordon LLP

(57) ABSTRACT

This gearbox to be assembled to a turbomachine portion and driven by a power take-off radial shaft thereof, includes several branches, the essential advantage of which is to allow a great amount of pieces of equipment to be driven to be accommodated, without implying a significant overall size in any dimension, since the gearbox remains close to the turbomachine and the pieces of equipment can be distributed on a large surface area. The housing (5) is divided into portions (27, 28) assembled to each other at the bends, in order to reduce its manufacturing cost.

10 Claims, 3 Drawing Sheets

(56) References Cited

U.S. PATENT DOCUMENTS

Figure 1:
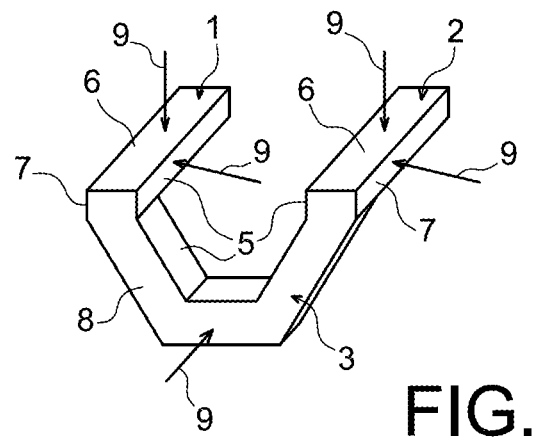

| | | |
|---|---|---|
| 2004/0012282 A1 | 1/2004 | Haga |
| 2012/0006137 A1 | 1/2012 | Short |
| 2012/0117982 A1 | 5/2012 | Suciu |
| 2013/0145774 A1* | 6/2013 | Duong .................. F02C 7/32 60/802 |

OTHER PUBLICATIONS

U.S. Appl. No. 14/423,801, "Drive Gearbox on a Turbomachine, Consisting of a Drive Train with Gear Lines Extending Into Non-parallel Planes" including Preliminary Claim Amendments, filed Feb. 25, 2015.

* cited by examiner

POWER TAKE-OFF GEARBOX ON A TURBOMACHINE, CONSISTING OF AN ASSEMBLED HOUSING

The field of the invention is a power take-off gearbox on a turbomachine, for transmitting the movement originating from the turbomachine, through a radial shaft projecting from the same, to various pieces of equipment related to the turbomachine, such as pumps, power generators, etc., which are essential to the operation of the turbomachine or to other apparatuses of an aircraft propelled by this turbomachine. In the present invention, the box housing is divided and consists of assembled portions.

The gearbox substantially comprises a drive chain consisting of all the toothed wheels, meshing with each other so as to transmit the movement of the radial shaft to the pieces of equipment, inside the housing. This chain is thus connected to the radial shaft of the turbomachine and to power take-off shafts of the pieces of equipment. The gearbox is attached to the turbomachine at the wanted position and the pieces of equipment are in turn attached to the gearbox. A document describing a gearbox of a known design is US-A-12/0006137. There are succinctly represented the drive shaft of the turbomachine, the radial shaft and the actual gearbox, comprising a drive chain consisting of spur wheels in a housing. A piece of equipment is located on the box opposite the attachment to the turbomachine. Since all the axes of the toothed wheels are parallel, the gearbox of this prior document comprises a single gear line.

By gear line, it is meant a set of adjacent gears belonging to the drive chain, in principle in mesh with each other, the toothed wheels of which are located in a same plane or in parallel planes; in other words, the axes of rotation of the toothed wheels are all parallel (perpendicular to this plane or to these parallel planes), and it is considered that the toothed wheels directly in mesh with each other extend in a same plane; the gear line can however be continued in parallel planes if there are toothed wheels lined up along a same axis of rotation.

Searching for decreasing the overall size causes the preferential use of gearboxes the drive chain of which includes several gear lines in different planes, rather than a single gear line according to the traditional design. These gear lines are successive and joined by junction gears having non-parallel axes. The sinuous shape of the drive chain enables it indeed to remain adjacent to the turbomachine throughout its length, by avoiding all the unavoidable significant radial, axial and angular overall sizes when only a gear line is present which has to have a certain length, all these significant overall sizes having their drawbacks.

It would be logical, in order to maintain the reduction in the overall size, that the housing of the gearbox should consists of branches each accommodating one of the gear lines, these branches having main extension directions coinciding with those of their gear lines, but the manufacturing cost of the housing would become high, regardless of whether foundry or machining is used, because either a complex mold should be manufactured, or a high quantity of matter should be sacrificed, with possible molding difficulties or long machining times.

The essential object of the invention is to reduce the manufacturing cost of a housing of a gearbox consisting of several successive branches extending in different directions, and thus to make the use of gearboxes the drive chain of which consists of several gear lines more interesting.

In accordance with the invention, the housing consists of distinct portions having a simple shape corresponding to its branches, assembled to each other at the junction interfaces after they have been separately manufactured. These portions will generally have a simple shape, being rectilinear or semi-circular for example, and short enough, which will yield a lesser total manufacturing cost than a unit housing, and even than a housing of a traditional box with a single gear line, which is expansive to manufacture because of its long length, even if its shape is simple.

Advantageously, the junction interfaces between the assembled portions of the housing coincide with the junction interfaces of the gear lines (meshing portions of the junction gears), such that the ends of the gear lines are flush with the ends of the housing portions before being assembled without clearly projecting therefrom, which facilitates the handling of the portions of the gearbox, and then their assembly. This coincidence of the junction interfaces is however not necessary. If it exists, several embodiments are conceivable. The junction interface can thus be oblique at the branches, and the junction gear then consists of spur or bevel wheels; or the junction interface can be located on one of the main faces of one of the housing portions and the junction gear will then consist of spur or bevel wheels.

Figure 5:
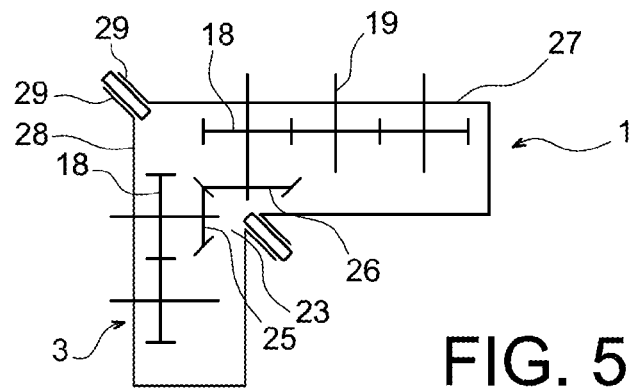
Figure 6:
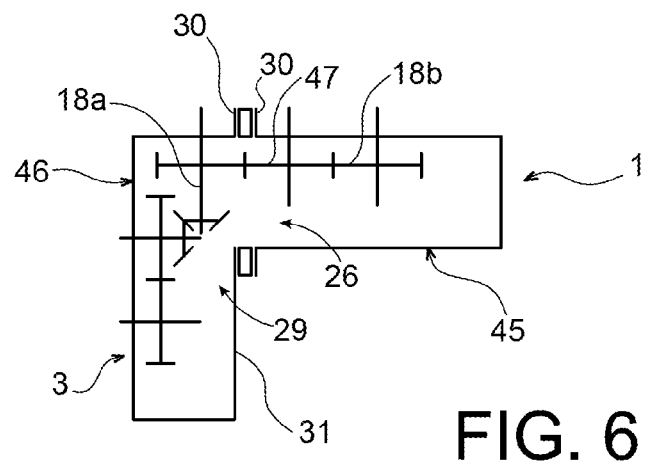
Figure 7:
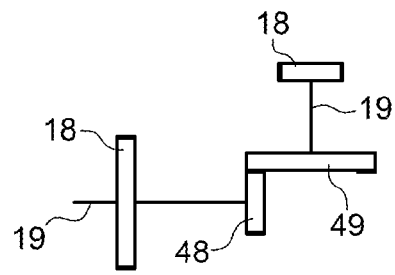

Some embodiments of the invention will now be described by means of the following figures; it is clear that other embodiments are possible and that this description is purely illustrating:

FIGS. 1, 2, 3 and 4 illustrate a gearbox that can embody the invention;

and FIGS. 5, 6 and 7 illustrate how the invention can be applied to this gearbox.

Figure 2:
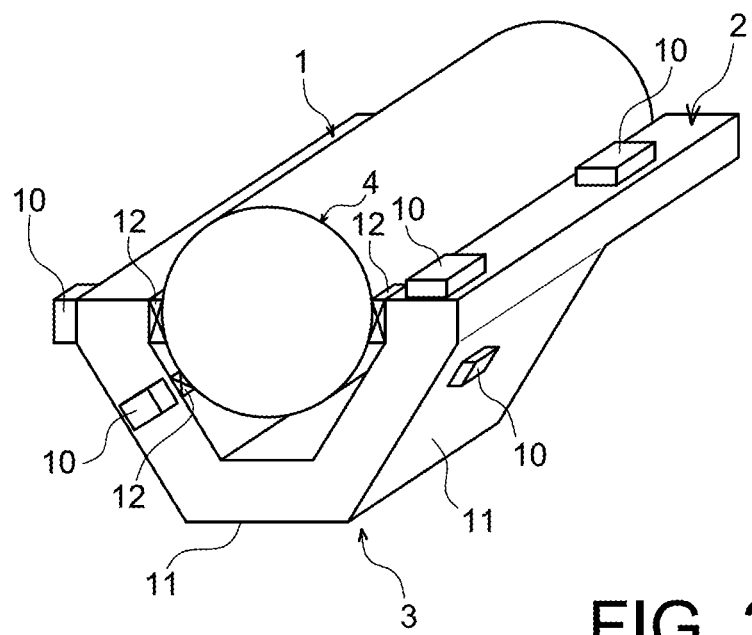

One embodiment of a gearbox is described by means of the first FIGS. 1 to 4. It has, according to FIG. 1, a three dimensional shape comprising an outer housing with two end branches 1 and 2 being parallel and rectilinear and a partly circular median branch 3 connecting the previous ones and which is perpendicular thereto. FIG. 2 illustrates that this gearbox can be advantageously placed about a turbomachine 4, for example in the place of a high pressure body thereof, by placing the end branches 1 and 2 in the axial direction of said turbomachine, to diametrically opposed generators, the median branch 3 consequently also running alongside the turbomachine 4 by about-turning around it. The power take-off of the turbomachine can be directly made from a conventional radial shaft belonging to the turbomachine 4, or through an intermediate shaft belonging to a separate casing and in mesh with the radial shaft. Some possibilities of positions of the drive (radial or intermediate) shaft are indicated by reference 9 in FIG. 1.

The pieces of equipment 10 driven by the gearbox can be in turn mounted on upper 6, peripheral 7 and front 8 faces, as well as on radially outer faces 11 of the median branch 3. The attachment of the gearbox to the turbomachine 4 can be carried out by boltings of attachment points 12 located on the housing 13, possibly by using wedges or other intermediate supports between the turbomachine 4 and, for example, some of the inner faces 5 of the box. The pieces of equipment 10 are attached to the housing 13 by other attachment points 12.

Figure 3:
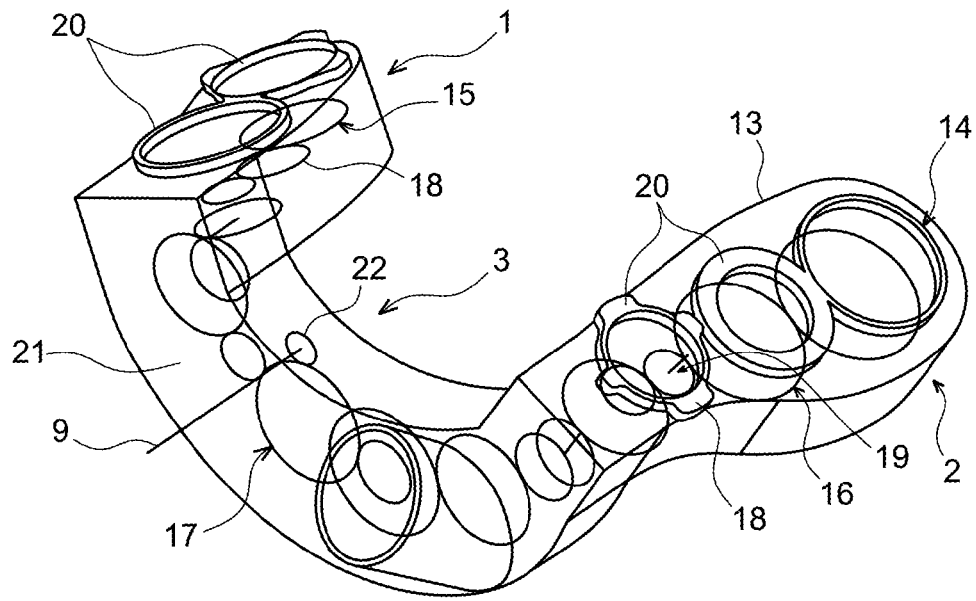

FIG. 3 shows that the gearbox essentially consists of a housing 13 defining the perimeter of three branches 1, 2 and 3, and of a drive chain 14 contained in the housing 13 and wherein three gear lines 15, 16 and 17 can be distinguished, respectively accommodated in a respective branch 1, 2 and 3. Each of them comprises toothed wheels 18, generally spur wheels in mesh with each other to form straight spur gearings, the axes 19 of some of these toothed wheels 18 being exploited to rotatably drive the moveable parts of the pieces of equipment 10, by passing through apertures 20 of the housing 13. The number of toothed wheels 18, their diameters and their gear teeth ratio, as well as the positions of the apertures 20 defining the drive axes 19 of the pieces of equipment 10 can be chosen quite freely, depending on the rotation speeds desired to be transmitted and the positions of the pieces of equipment 10. A particular aperture 21 is intended to the input of the drive shaft 9, which further comprises a drive pinion 22 in mesh with any of the toothed wheels 18.

Figure 4:
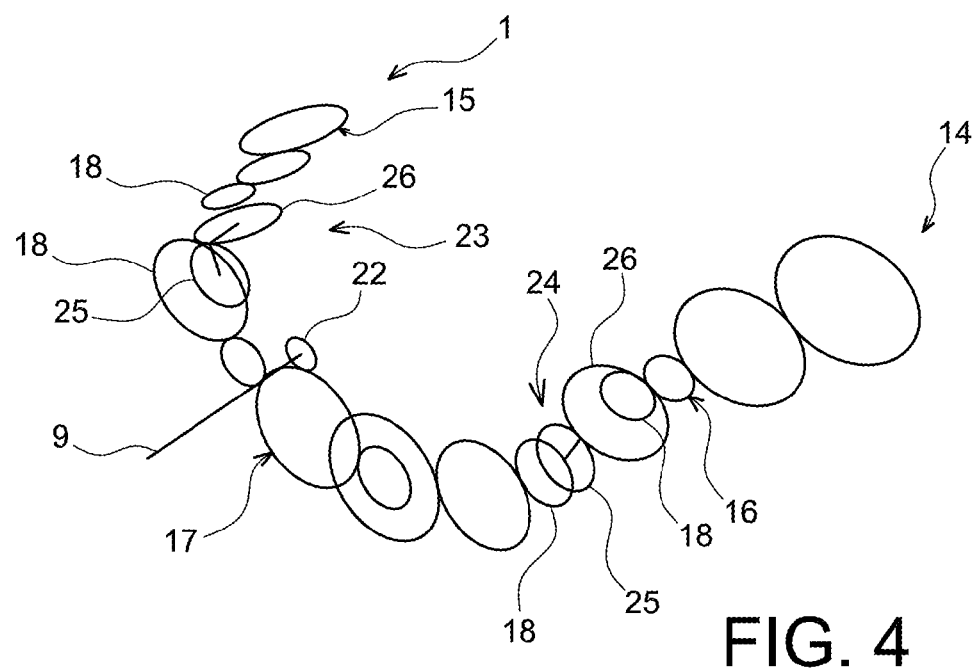

FIG. 4 represents the drive chain 14 on its own. The connection between the three gear lines 15, 16 and 17 is made by junction gears 23 and 24 having non-parallel axes. Each of them can consist of a first bevel pinion 25, integral with and coaxial to an end toothed wheel 18 of the gear line 17, and a second bevel pinion 26, also integral with and coaxial to an end toothed wheel 18 of one of the other gear lines 15 or 16. The junction gears 23 and 24 thus ensure the continuity of the drive chain 14 and the capability to move it wholly by the single drive pinion 22. They also enable each of the gear lines 15, 16 and 17 to be oriented in the direction of the branch 1, 2 or 3 of the housing 13.

The bent portions for connecting branches of the housing 13 in a three dimensional bent shaped gearbox in accordance with the invention will now be described in further detail. It is possible, as shown in FIG. 5, to place the junction gear 23 (for example) just at the bend formed by the two consecutive branches (here 1 and 3). As it would be costly to directly build the housing 13, of a complex shape, in accordance with the invention, it is built in portions particular to each of the branches, here 27 and 28 for the branches 1 and 3, which are assembled by flanges bolted to each other, with the insertion of a gasket or an intermediate flange if required.

In the embodiment of FIG. 5, flanges 29 define a junction interface between the housing portions 27 and 28, which interface extends in a plane intersecting the bend, that is obliquely to the main extension directions of the branches 1 and 3, and precisely at the diagonal of the bend. The junction of the bevel pinions 25 and 26 then extends in a planar junction interface, such that the bevel pinions 25 and 26 are flush with the aperture of the housing portions 27 and 28 before being assembled, and, moreover, all the toothed wheels 18 can have parallel axes 17 inside each of the housing portions 27 and 28, each of the gear lines belonging to a distinct housing portion. Both these characteristics simplify the design of the housing and the assembly of its portions 27 and 28.

Another advantageous possible embodiment is represented in FIG. 6. The junction interface here extends in parallel to main faces of the branches 1 and 3, herein in the plane of an inner face 31 of the branch 3, and, in substitution for an end face of the branch 1, this junction interface being defined by flanges 30 analogous to the previous ones. The advantage of this design is that the shapes of the housing portions, here 45 and 46, are devoid of beveled end regions, and thus are simplified. The advantage present in the previous embodiment, that the drive chain is divided into portions the ends of which are flush with the junction interface, can be kept if the junction bevel gear of the gear lines which is defined by the bevel pinions 25 and 26 is entirely located in one of the branches, here 3, and that the drive chain 14 comprises a junction gear belonging to one of the gear lines (here 15) and formed by spur wheels 18, here noted 18a and 18b, the meshing junction 47 of which coincides with the junction interface 30. The slight drawback of this design is that the housing portion 46 contains a toothed wheel (18a) the axis 19 of which has a direction different from that of the others, and thus a slight complication is introduced in this place.

Analogous arrangements could also be recommended for the junction between the branches 2 and 3, which has not been represented and, generally, for any connection of branches of different directions, whatever its shape and in particular the angle made by the branches, and whatever the number of branches of the gearbox.

An equivalent design from the kinematic point of view would consist in replacing the bevel pinions 25 and 26 by a straight pinion 48 and a ring gear 49 on a plane, which is represented by FIG. 7, without modifying other details of the embodiment.

What is claimed is:

1. A gearbox to be attached to a turbomachine (4) for driving at least one piece of equipment (10) related to the turbomachine, comprising a housing (13), a drive chain (14) internal to the housing, as well as a power take-off member for meshing with a transmission shaft of the turbomachine, the housing comprising attachment points (12) to the turbomachine and the piece of equipment, characterized in that the drive chain consists of a plurality of successive gear lines and forming angles to each other, the housing (13) comprises at least two consecutive portions, assembled to at least one junction interface, forming an angle to each other and each containing one of the gear lines (15, 16, 17), and said portions (27, 28; 45, 46) are distinct and assembled to each other at the junction interface.

2. The gearbox according to claim 1, characterized in that the junction interface of the housing portions is oblique to the branches.

3. The gearbox according to claim 2, characterized in that the junction interface of the housing portions is at a diagonal of a bend of the housing.

4. The gearbox according to claim 1, characterized in that the junction interface of the housing portions is parallel to a main face of one of said housing portions.

5. The gearbox according to claim 4, characterized in that the junction interface of the housing portions belongs to said main face.

6. The gearbox according to claim 1, characterized in that the drive chain comprises a gear having a meshing junction (47) which coincides with the junction interface (30) of the housing portions.

7. The gearbox according to claim 6, characterized in that said gear is the junction gear of both gear lines.

8. The gearbox according to claim 7, characterized in that the junction interface of the housing portions is oblique to the branches and the junction gear of both gear lines consists of bevel wheels.

9. The gearbox according to claim 6, characterized in that the junction interface of the housing portions is parallel to a main face of one of said housing portions and said gear consists of spur wheels (18a, 18b).

10. The gearbox according to claim 1, characterized in that the consecutive housing portions comprise at least one rectilinear branch (1, 2) and a partly circular branch (3) assembled to the rectilinear branch, the gear lines (15, 16, 17) each consisting of toothed wheels having axes of rotation all perpendicular to a same plane.

* * * * *